(12) United States Patent
Yamada

(10) Patent No.: US 11,705,081 B2
(45) Date of Patent: Jul. 18, 2023

(54) DISPLAY DEVICE FOR VEHICLE

(71) Applicant: Yazaki Corporation, Tokyo (JP)

(72) Inventor: Yoshihisa Yamada, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/464,758

(22) Filed: Sep. 2, 2021

(65) Prior Publication Data

US 2022/0093050 A1    Mar. 24, 2022

(30) Foreign Application Priority Data

Sep. 23, 2020  (JP) .................................. 2020-158313

(51) Int. Cl.
  *G09G 3/36*    (2006.01)
  *G01D 7/02*    (2006.01)

(52) U.S. Cl.
  CPC ............. *G09G 3/3607* (2013.01); *G01D 7/02* (2013.01); *G09G 3/3648* (2013.01); *G09G 2354/00* (2013.01); *G09G 2380/10* (2013.01)

(58) Field of Classification Search
  CPC ...... G09G 3/3607; G09G 3/3648; G09G 5/02; G09G 2320/0686; G09G 2340/04; G09G 2354/00; G09G 2380/10; G06F 3/147; G01D 7/02; B60K 35/00; B60K 2370/155; B60K 2370/167; B60K 2370/172; B60K 2370/179; B60K 2370/1868; B60K 2370/188; B60K 2370/195; B60K 2370/331; B60K 2370/332; B60K 2370/52; B60K 2370/152

See application file for complete search history.

(56) References Cited

U.S. PATENT DOCUMENTS

| 10,071,631 | B1* | 9/2018 | Aizawa | .................. B60K 35/00 |
| 2008/0258892 | A1* | 10/2008 | Itoh | ........................ G01D 7/002 |
| | | | | 348/E13.001 |
| 2008/0266304 | A1* | 10/2008 | Okumura | ............... B60K 37/02 |
| | | | | 345/534 |
| 2009/0112389 | A1* | 4/2009 | Yamamoto | ................ B60R 1/00 |
| | | | | 701/31.4 |

(Continued)

FOREIGN PATENT DOCUMENTS

| JP | 2005-289096 A | 10/2005 |
| JP | 2016-114543 A | 6/2016 |

(Continued)

*Primary Examiner* — David Tung
(74) *Attorney, Agent, or Firm* — Sughrue Mion, PLLC

(57) ABSTRACT

A display device for vehicle capable of reducing visual recognition burden on a driver and shortening watching time is provided. The display device for vehicle includes a liquid crystal display including a first area, a second area and a third area as display areas, and a CPU configured to switch the liquid crystal display between a normal display mode and a simple display mode. The CPU is configured to, in the normal display mode, make the first area, the second area and the third area to display vehicle information, and in the simple display mode, put the first area and the second area in a non-displayed state and make only the third area to display in digital indication at least speed information among the vehicle information.

7 Claims, 4 Drawing Sheets

(56) References Cited

U.S. PATENT DOCUMENTS

| | | | |
|---|---|---|---|
| 2009/0228175 A1* | 9/2009 | Borgesson | B60K 35/00 345/161 |
| 2010/0302018 A1* | 12/2010 | Tuzar | B60K 37/02 340/425.5 |
| 2011/0210838 A1* | 9/2011 | Fujiki | G07C 5/0816 340/439 |
| 2017/0162168 A1* | 6/2017 | Lopez | B60K 37/02 |
| 2018/0326850 A1* | 11/2018 | Recktenwald | B60K 37/06 |
| 2021/0237572 A1* | 8/2021 | Jahns | B60K 35/00 |

FOREIGN PATENT DOCUMENTS

| | | |
|---|---|---|
| JP | 2017-140983 A | 8/2017 |
| JP | 6256248 B2 | 1/2018 |
| JP | 2018081075 A | 5/2018 |
| JP | 2018-176781 A | 11/2018 |
| JP | 2019-123373 A | 7/2019 |

\* cited by examiner

DISPLAY DEVICE FOR VEHICLE

TECHNICAL FIELD

The present invention relates to a display device for vehicle configured to be mounted on a vehicle.

BACKGROUND

Recently, as a meter device for a vehicle, a full-graphic meter device (also referred to as a full-digital meter device) using a TFT (Thin Film Transistor) liquid crystal display or the like is increasingly used. In addition, size of a display itself is increasing, and not only a speedometer but many other contents (i.e., vehicle information) are also displayed in the meter device, making it difficult for a driver to find information the driver wants to check during driving.

In a full-graphic meter device using a large display, in many cases it is configured such that, for example, display brightness is reduced during the night time, or a night-time display color is used. Thus, although a driver is less likely to feel annoyed by the brightness of the display of the meter device when driving in an urban area where the surroundings are bright, the driver may feel annoyed when driving in a suburban road where there are only few street lights. The full-graphic meter device as described above has a function of adjusting the brightness; however, this decreases the brightness of the entire meter device and thus the display brightness of the speedometer and such which the driver always needs to check is also decreased, causing a decrease in visibility.

Patent Document 1 describes switching from analog indication to digital indication during autonomous driving, reducing a display generation period, reducing brightness of a narrowed part of an image display area for providing vehicle information, and consequently reducing power consumption.

Further, Patent Document 2 describes changing a background color based on on/off information of a lighting so that the brightness of the background color is lower when the lighting is turned on than when it is turned off, thereby increasing the visibility at low cost.

PRIOR ART DOCUMENT

Patent Document 1: JP 2019-123373 A
Patent Document 2: JP 2017-140983 A

SUMMARY OF THE INVENTION

Problem to be Solved by the Invention

The full-graphic meter device using a large display has high degree of freedom in design and can display many contents; however, there may be the case where the amount of information is too large and/or a user is not understanding the contents of the displayed information.

Further, although the full-graphic meter device can display a map for navigation and such, a user may sometimes feel that the map and such does not need to be displayed when driving on a commonly used road. In addition, a user may sometimes feel annoyed by many status indications and/or an indication of a power meter and such that changes frequently.

The invention described in Patent Document 1 aims to reduce the power consumption for the meter indication during autonomous driving, but is not focusing on visual recognition burden on a driver and/or a watching time of a driver. The invention described in Patent Document 2 is related to displaying of the meter indication while the lighting is on, and is not intended to reduce a visual recognition burden on a driver and/or to shorten a watching time of a driver for day time and night time.

In view of this, an object of the present invention is to provide a display device for vehicle capable of reducing a visual recognition burden on a driver and shortening a watching time of a driver.

Solution to the Problem

In order to achieve the above-described object, the present invention provides, in a first aspect, a display device for vehicle including a display unit including a first area, a second area and a third area as display areas, and a control unit configured to switch the display unit between a first display mode and a second display mode, wherein the control unit is configured to, in the first display mode, make the first area, the second area and the third area to display vehicle information, and in the second display mode, put the first area and the second area in a non-display state and make the third area to display in digital indication at least speed information among the vehicle information.

Advantageous Effect of the Invention

As described above, according to the present invention, information is displayed limitedly only in the third area and the displayed information is also limited, thus it is possible to reduce a visual recognition burden on a driver and to shorten a watching time of a driver.

DETAILED DESCRIPTION OF THE EXEMPLARY EMBODIMENTS

Figure 1:
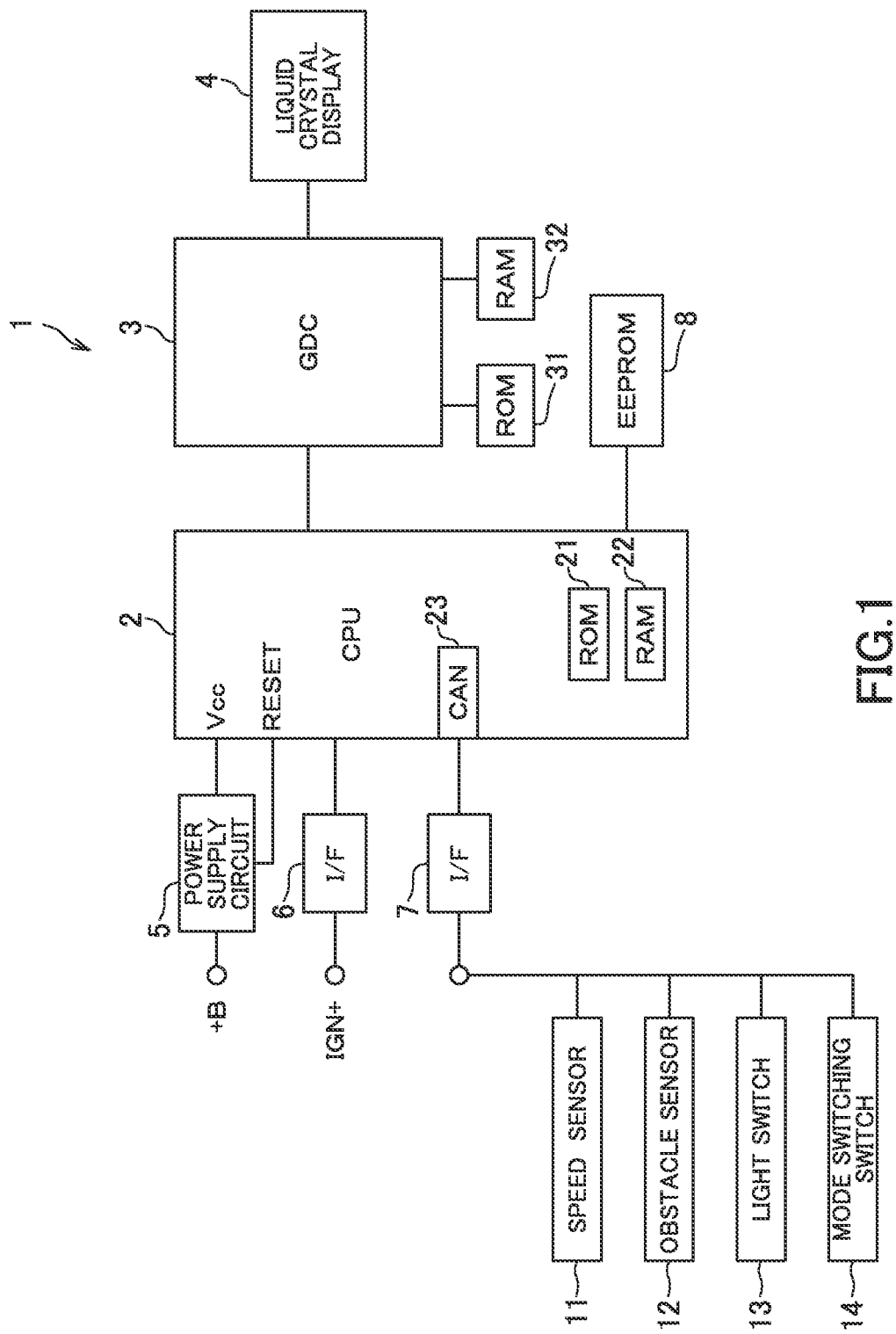
FIG. 1 is a block diagram showing a hardware configuration of a display device for vehicle according to one embodiment of the present invention.

In the following, one embodiment of the present invention will be described with reference to the drawings. FIG. 1 is a block diagram showing a hardware configuration of a display device for vehicle according to one embodiment of the present invention. As shown in FIG. 1, the display device for vehicle 1 includes a CPU 2, a GDC 3, a liquid crystal display 4 and a EEPROM 8.

The CPU 2 includes ROM 21, RAM 22 and a network unit (CAN) 23. The ROM 21 stores a control program, etc. The RAM 22 is used as a working area.

The network unit 23 communicates with other devices via a communication I/F 7 according to the CAN (Controller Area Network) standard and inputs various vehicle information. Further, information about other devices that are connected to the communication I/F 7 such as a speed sensor 11, an obstacle sensor 12, a light switch (SW) 13 and a mode switching switch (SW) 14 is inputted to the network unit 23.

The speed sensor 11 detects the speed of a vehicle (i.e., vehicle speed) on which the display device for vehicle 1 is mounted. The obstacle sensor 12 detects an obstacle such as a preceding vehicle in front of the vehicle. The obstacle sensor 12 may be constituted of a millimeter-wave radar, a laser radar or a vehicle-mounted camera, etc.

The light switch 13 is a switch capable of switching between on and off of a headlight of the vehicle. In place of using the light switch 13, information indicating that the headlight is turned on may be acquired. The mode switching switch 14 is a switch capable of manually switching between a first display mode and a second display mode described later. These switches are installed at positions operable by a driver, such as at a steering column and an instrument panel.

The CPU 2 as a control unit is configured such that a signal from an ignition switch (IGN+) is inputted thereto via an input interface (I/F) 6. Further, the CPU 2 is connected to a power supply circuit 5 to which power is supplied from a battery (+B) and which outputs a power supply voltage Vcc and a reset voltage.

The GDC 3 is a graphics display controller that displays graphical elements on a screen of the liquid crystal display 4 according to instructions inputted from the CPU 2. The GDC 3 is connected to ROM 31 in which a graphics drawing program is stored and RAM 32 which is frame memory for holding a display content for each pixel.

The liquid crystal display 4 as a display unit has a two-dimensional display screen (i.e., a graphic display screen) constituted of a TFT liquid crystal display and having a color provided by arranging a plurality of minute display cells in an X direction and in a Y direction. The liquid crystal display 4 is configured to individually control, for the respective cells, display states of the plurality of minute display cells to graphically display, in color, various information such as figures, characters, images and such on the two-dimensional display screen.

Figure 2:
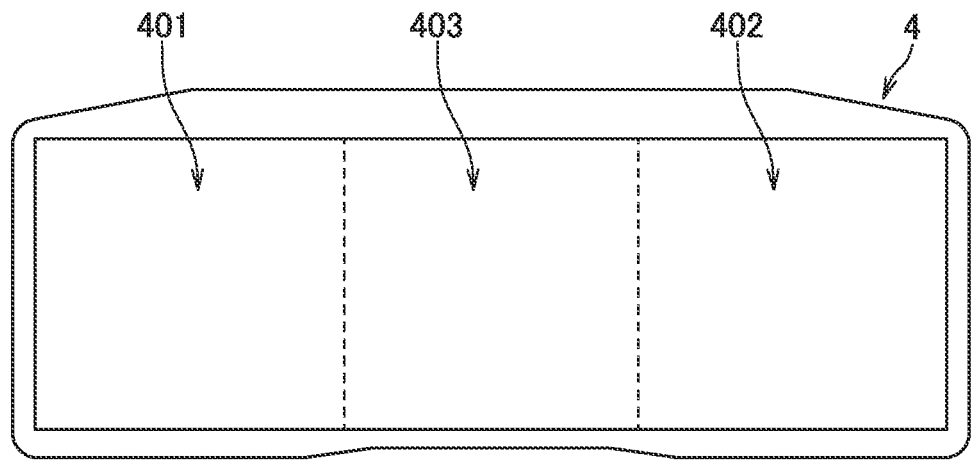
FIG. 2 is an example of a screen configuration of a liquid crystal display shown in FIG. 1.
Figure 3:
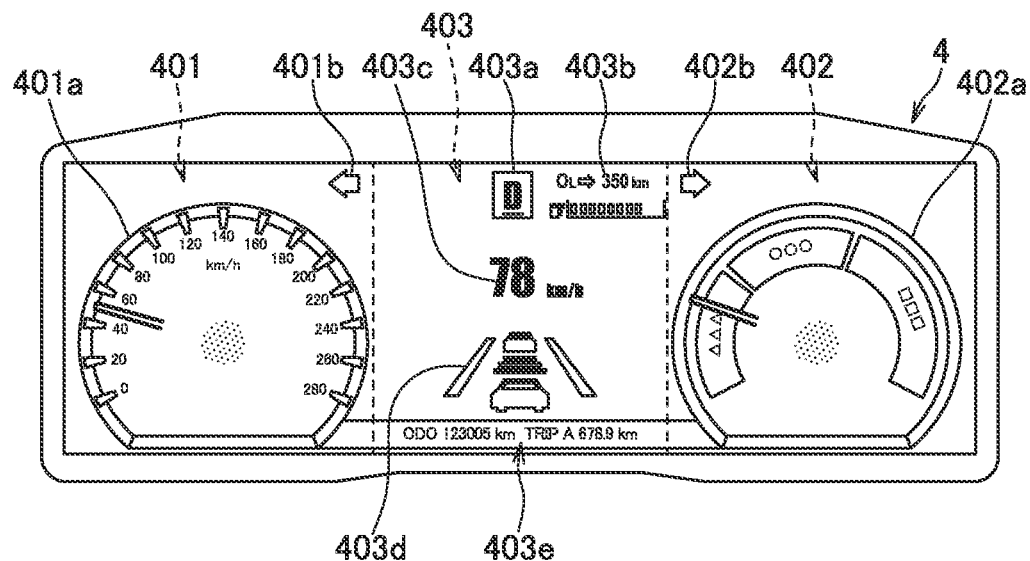
FIG. 3 is a displaying example of the liquid crystal display shown in FIG. 2 in a normal display mode.
Figure 4:
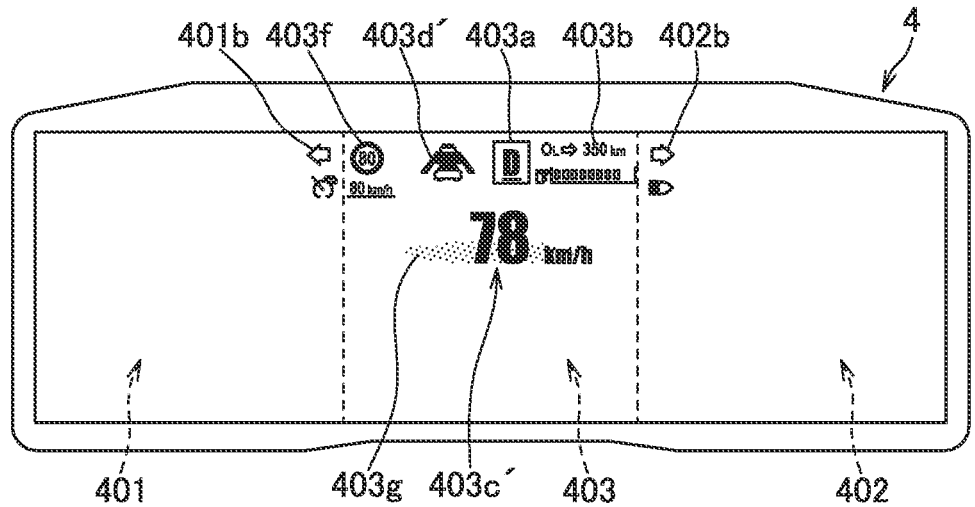
FIG. 4 is a displaying example of the liquid crystal display shown in FIG. 2 in a simple display mode.

Referring to FIG. 2 to FIG. 4, the following will describe how the liquid crystal display 4 of the display device for vehicle having the above-described configuration displays contents. FIG. 2 is an example of a screen configuration of the liquid crystal display 4. The liquid crystal display 4 includes, as display areas on its screen, a first area 401 on the left side of the screen, a second area 402 on the right side of the screen, and a third area 403 at a center of the screen.

In the first area 401, an image of an indicator such as a speedometer is mainly displayed as the vehicle information (refer to FIG. 3). In the second area 402, an image of an indicator such as a power meter or a tachometer is mainly displayed as the vehicle information (refer to FIG. 3). In the third area 403, for example, a shift indication or a digital speed indication or information such as an operation state of an ADAS (advanced driving support system) is displayed as the vehicle information (refer to FIG. 3).

Further, in the first area 401 and in the second area 402, the vehicle information is always displayed in a later-described normal display mode. In a later-described simple display mode, the first area 401 and the second area 402 are put in a non-displayed state (i.e., the vehicle information is not displayed thereon), and only when information that needs to be notified to a driver is generated, the it is displayed on the first area 401 and the second area 402. On the other hand, in the third area 403, vehicle information is always displayed in both of the normal display mode and the simple display mode. A display example in the normal display mode and in the simple display mode will be described with reference to FIG. 3 and FIG. 4.

The simple display mode is a display mode provided as a function intended for a user who feels annoyed by the display during the night time use, or intended for a user such as an aged user who feels the amount of information is too large in the normal display mode, and, in the simple display mode, only the minimum number of items are displayed in the third area 403 located at a substantially center area of the liquid crystal display 4.

FIG. 3 illustrates a display example in the normal display mode. In the normal display mode, a speedometer 401*a* and a left turn direction indicator 401*b* and such are displayed in the first area 401, and a power meter 402*a*, a right turn direction indication 402*b* and such are displayed in the second area 402. Further, in the normal display mode, a shift indication 403*a*, a driving range and a battery level 403*b*, a digital speed indication 403*c*, an ADAS operation indication 403*d*, an odometer and a trip meter 403*e*, etc. are displayed in the third area 403. With respect to the driving range and the battery level 403*b*, a remaining amount of fuel such as gasoline may be provided in place of the battery level.

FIG. 4 is a display example in the simple display mode. In the simple display mode, the speedometer 401*a* that was displayed in the first area 401 is not displayed, and only a part of the tell-tale (i.e., a warning lamp) such as the left turn direction indication 401*b* is displayed. The left turn direction indication 401*b* is displayed only when turning left, and the tell-tale is also displayed only when the warning and such is required. Thus, the vehicle information is not always displayed in the first area 401 in the simple display mode. That is, according to the present invention, put the first area and the second area in the non-displayed state in the second display mode means that the contents such as the speedometer 401*a* that are always displayed in the first display mode (the normal display mode) are not displayed in the second display mode.

Similarly, in the second area 402, when it is in the simple display mode, the power meter 402*a* is not displayed, and only a part of the tell-tale such as the right turn direction indicator 402*b* is displayed.

In the simple display mode, the shift indication 403*a*, the driving range and the battery level 403*b*, a digital speed indication 403*c'*, an ADAS operation indication icon 403*d'*, a set vehicle speed 403*f* and a power ambient indication 403*g* are displayed in the third area 403.

With respect to the digital speed indication 403*c'*, the size of the number is larger than that in the digital speed indication 403*c* in the normal display mode. The ADAS operation indication icon 403*d'* is a simple icon-like image corresponding to the ADAS operation indication 403*d* in the normal display mode which is realistic and graphical indication. The power ambient indication 403*g* is ambient representation in color provided in accordance with the position of a pointer of the power meter 402*a*. The power ambient indication 403*g* is displayed so as to be superimposed on the digital speed indication 403*c'* as shown in FIG. 4. In the simple display mode, only one of the driving range and the battery level may be displayed with respect to the driving range and the battery level 403*b*.

In the simple display mode, the display position of the shift indication 403*a*, the driving range and the battery level 403*b* and the digital speed indication 403*c'* are the same as the display position of the shift indication 403*a*, the driving range and the battery level 403*b* and the digital speed indication 403*c* in the normal display mode. Although there may be a slight displacement due to the change in the character size and/or the reduction in the amount of information to be displayed, such displacement is within the same position according to the present invention. In other words, in the simple display mode, the layout of the contents that are displayed in the third area 403 in the normal display mode is the same. Thus, by matching the display position in the normal display mode with the display position in the simple display mode, the display position of the important vehicle information does not change when the display mode is switched, eliminating the need for a driver to check the display position again.

As described above, in the simple display mode, the contents (i.e., the vehicle information) displayed in the third area 403 are only the information related to laws and regulations such as the speedometer and the ADAS operation information, and other contents that need not be always displayed are switched to the symbol indication such as an icon. Further, the speedometer is a digital speed indication, and the ADAS operation information is also the symbol indication such as an icon rather than a realistic graphical indication.

In the example shown in FIG. 4, the upper part of the third area 403 is configured to be the always-displayed area; however, a central part of the third area 403 or a lower part of the third area 403 may be used as the always-displayed area.

The switching between the normal display mode and the simple display mode may be performed manually by a driver. The switching may be automatically performed according to the vehicle speed, the presence or absence of a preceding vehicle, or the headlight turned on. The vehicle speed can be obtained from the speed sensor 11, the presence or absence of a preceding vehicle can be determined based on the detected result from the obstacle sensor 12, and the headlight turned on can be detected from the light switch 13. For example, when the vehicle speed is equal to or higher than a certain speed, or when there is no preceding vehicle, or when the headlight is turned on, the display mode can be switched to the simple display mode to reduce the driver's visual recognition burden.

As described above, the normal display mode functions as the first display mode, and the simple display mode functions as the second display mode. In the first display mode, the first area 401, the second area 402 and the third area 403 are caused to display the vehicle information, and in the second display mode, the first area 401 and the second area 402 are caused not to display information (i.e., are put in the non-displayed state) and only the third area 403 is caused to display in digital indication at least the speed information among the vehicle information.

Figure 5:
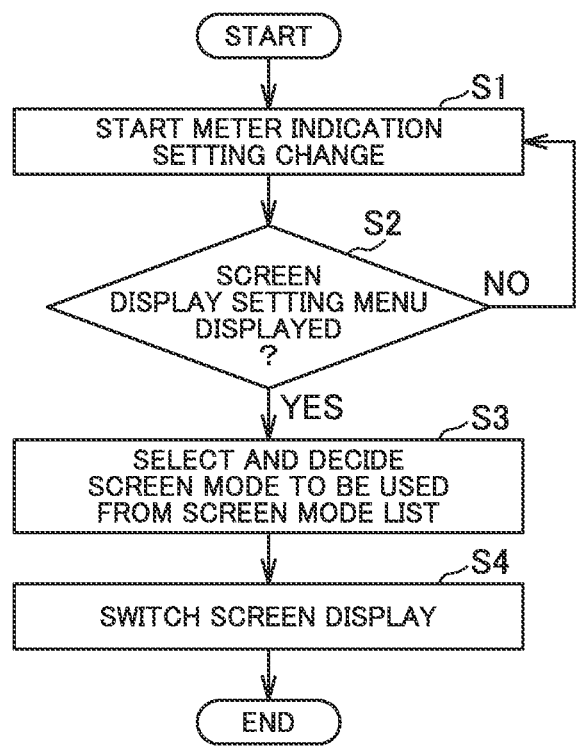
FIG. 5 is a flowchart of a display mode switching operation of the display device for vehicle shown in FIG. 1.

FIG. 5 shows a flowchart of the operation for manually switching between the normal display mode and the simple display mode. This flowchart is executed by the CPU 2.

First, a switch or the like provided on the steering wheel or the like is operated to start changing the setting of the meter indication (step S1). Then, it is determined whether a screen display setting menu is displayed on the liquid crystal display 4 (step S2). Since setting menu other than the screen display setting menu is also displayed on the liquid crystal display 4, when the screen display setting menu is not selected (NO in step S2), then steps S1 and S2 are repeated until the screen display setting menu is selected.

On the other hand, when the screen display setting menu is selected (YES in step S2), the screen mode (i.e., the display mode) to be used is selected and decided from the screen mode list (step S3). Then, the screen display is switched according to the selected display mode (step S4).

As shown in FIG. 4, the upper part of the third area 403 is used in the simple display mode. Thus, the lower part of the third area 403 is in the non-displayed state, and this non-display area may be used for the answerback indication when the setting of the ADAS such as the ACC (Adaptive Cruise Control) is changed, for example. An example of the case of the answerback indication will be described with reference to FIG. 6A to FIG. 6C.

Figure 6A:
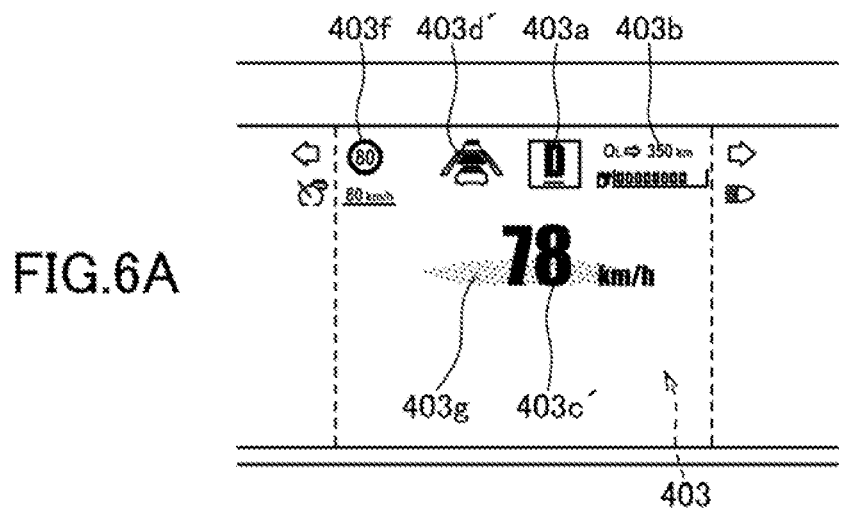
FIG. 6A to FIG. 6C illustrate an example of an answer-back indication in the simple display mode shown in FIG. 4.
Figure 6B:
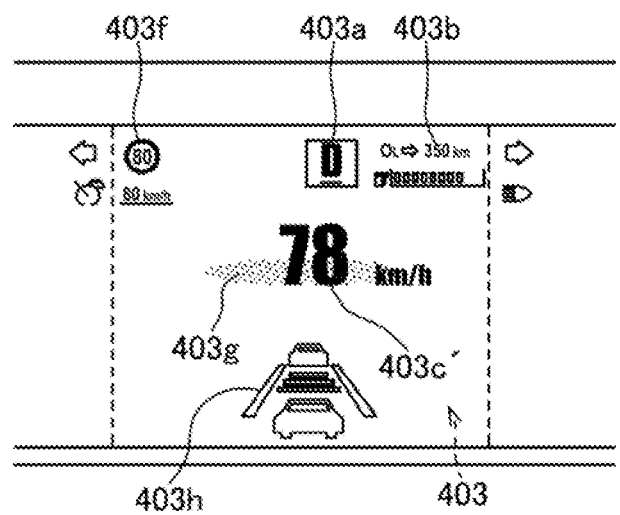
Figure 6C:
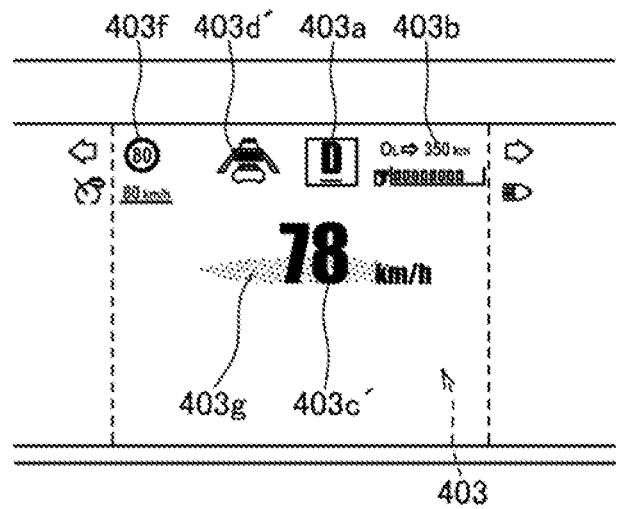

FIG. 6A to FIG. 6C illustrate a part of the third area 403 of the liquid crystal display 4. FIG. 6A shows the display state prior to changing the setting of the ADAS. When the setting of the ADAS such as the inter-vehicle distance in the ACC is changed in this state, the answerback indication 403*h* indicating that the change in the setting has been accepted is displayed in the lower part of the third area 403, as shown in FIG. 6B. At this time, the ADAS operation indication icon 403*d'* is deleted. When a predetermined period of time has elapsed from when the answerback indication 403*h* is displayed, the answerback indication 403*h* is deleted and the ADAS operation indication icon 403*d'* is displayed again, as shown in FIG. 6C.

Although the answerback indication 403*h* is displayed in FIG. 6A to FIG. 6C as a realistic and graphical indication similar to the ADAS operation indication 403*d*, the answerback indication 403*h* is not limited to this, and, it is preferable that it is at least an image larger than the ADAS operation indication icon 403*d'*.

That is, when the operation is performed with respect to the function that is being displayed in a form of symbol indication in the third area 403 in the simple display mode, the CPU 2 causes to change from the symbol indication to the answerback indication for this operation, and causes to return to the symbol indication after a predetermined period of time has elapsed after the change.

In this manner, the answerback indication can be provided by utilizing an area in which information is not always displayed in the simple display mode, thus a driver can easily recognize that the setting change or the like is performed. Although the lower part of the third area 403 is used as an area for use in the answerback indication, the first area 401 and the second area 402 in which information is not always displayed in the simple display mode may be used.

According to this embodiment, the display device for vehicle 1 includes the liquid crystal display 4 provided with the first area 401, the second area 402 and the third area 403 as display areas, and the CPU 2 that switches the liquid crystal display 4 between the normal display mode and the simple display mode. Further, the CPU 2 is configured to, in the normal display mode, cause the first area 401, the second area 402 and the third area 403 to display the vehicle information, and in the simple display mode, put the first area 401 and the second area 402 in the non-displayed state and cause only the third area 403 to display in digital indication at least the seed information among the vehicle information.

With the display device for vehicle 1 configured as described above, it is possible to gather the always-displayed contents within a predetermined area, thereby improving the visibility of the meter device and shortening a watching time by a driver. Further, by not displaying the contents that do not always need to be displayed, the illuminated area during the night-time driving can be reduced and a user can be less annoyed by the illumination. Further, in the case where the divisional control of the illumination for each area such as local dimming is performed, the division number of the turn-on/turn-off control can be minimized, thereby reducing the cost.

Further, a part of the contents (i.e., the vehicle information) displayed in the third area 403 in addition to the speed information is, in the simple display mode, displayed in a form of symbol indication which is simpler than that of the normal display mode. In this manner, it is possible to display with a reduced visual recognition burden which is suitable for a driver.

Further, the content (i.e., the vehicle information) displayed in the third area 403 is displayed at the same position in the normal display mode and in the simple display mode. Thus, the display position of the main content is not changed between the normal display mode and the simple display mode, thus a visual recognition burden on a driver can be reduced.

Further, when the operation is performed with respect to the function that is being displayed in a form of symbol indication in the third area 403 in the simple display mode, the CPU 2 causes a change from the symbol indication to the answerback indication for this operation, and causes to return to the symbol indication after a predetermined period of time has elapsed after the change. In this manner, the answerback indication can be provided by utilizing an area in which information is not always displayed in the simple display mode, thus it is possible to allow a driver to easily recognize that the setting change or the like is performed.

Further, the CPU 2 may automatically switch between the normal display mode and the simple display mode based on information among the speed information, the information indicating the presence or absence of a preceding vehicle and the information indicating that the headlight of the own vehicle is turned on. In this manner, it is possible to automatically reduce a visual recognition burden on a driver and shorten the watching time in accordance with conditions of the vehicle and conditions around the vehicle.

Further, in the simple display mode, the information about the power meter 402a displayed in the second area 402 in the normal display mode is superimposed on the digital indication as ambient indication (i.e., as change in color). In this manner, also in the simple display mode, the content that was displayed by the power meter 402a can be provided in color in a simple fashion instead of using the power meter 402a.

The area in which the vehicle information is displayed in the simple display mode is preferably the third area located at a center of the screen in view of the visibility and such; however, said area may be the first area or the second area.

The present invention is not limited to the above embodiments. That is, those skilled in the art can carry out various modifications according to conventionally known knowledge without departing from the gist of the present invention. Such modifications, as long as they have the configuration of the display device for vehicle according to the present invention, is still within the present invention.

LIST OF REFERENCE SIGNS 1 display device for vehicle
2 CPU (control unit)
4 liquid crystal display (display unit)
401 first area
402 second area
403 third area

What is claimed is:

1. A display device for a vehicle, comprising:
a display unit including a first area, a second area and a third area as display areas; and
a control unit configured to switch the display unit between a first display mode and a second display mode, wherein
the control unit is configured to,
in the first display mode, make the first area, the second area and the third area to display vehicle information, and
in the second display mode, put the first area and the second area in a non-displayed state and make the third area to display in digital indication at least speed information among the vehicle information, and
wherein a part of the vehicle information displayed in the third area in addition to the speed information is, in the second display mode and in response to switching from the first display mode to the second display mode, displayed in the third area in a form of symbol indication which is simpler than that in the first display mode,
wherein the control unit is configured to, when an operation is performed to a setting of a function that is being represented in a form of symbol indication in the third area in the second display mode, cause, in the third area, a change from the symbol indication to answerback indication for said operation, and cause a return to the symbol indication after a predetermined period of time has elapsed after the change.

2. The display device for the vehicle according to claim 1, wherein the vehicle information displayed in the third area is displayed in a same position in the first display mode and in the second display mode.

3. The display device for the vehicle according to claim 1, wherein the control unit is configured to automatically switch between the first display mode and the second display mode based on information among the speed information, information indicating presence or absence of a preceding vehicle and information indicating that a headlight of own vehicle is turned on.

4. The display device for the vehicle according to claim 1, wherein, in the second display mode, the vehicle information which was displayed in the second area or in the first area in the first display mode is displayed as a change in color so as to be superimposed on the digital indication.

5. The display device for the vehicle according to claim 1, wherein the part of the vehicle information displayed in the third area in addition to the speed information is, in the second display mode and in response to switching from the first display mode to the second display mode, displayed in the third area in a manner that is smaller than that in the first display mode.

6. The display device for the vehicle according to claim 1, wherein the change from the symbol indication to the answerback indication comprises removal of a display of the symbol indication from the second display mode.

7. The display device for the vehicle according to claim 1, wherein the setting comprises a setting of an inter-vehicle distance in an Adaptive Cruise Control (ACC).

* * * * *